(12) United States Patent
Gao et al.

(10) Patent No.: US 9,928,725 B2
(45) Date of Patent: Mar. 27, 2018

(54) METHOD AND DEVICE FOR REMINDING USER

(71) Applicant: Xiaomi Inc., Beijing (CN)

(72) Inventors: Yi Gao, Beijing (CN); Hongqiang Wang, Beijing (CN); Yunyuan Ge, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 15/226,922

(22) Filed: Aug. 3, 2016

(65) Prior Publication Data

US 2017/0092105 A1 Mar. 30, 2017

(30) Foreign Application Priority Data

Sep. 30, 2015 (CN) .......................... 2015 1 0642384

(51) Int. Cl.
*G08B 21/24* (2006.01)
*H04W 4/02* (2018.01)
*H04W 4/04* (2009.01)

(52) U.S. Cl.
CPC ............ *G08B 21/24* (2013.01); *H04W 4/021* (2013.01); *H04W 4/027* (2013.01); *H04W 4/028* (2013.01); *H04W 4/04* (2013.01)

(58) Field of Classification Search
CPC ....... H04W 4/02; H04W 4/021; H04W 4/027; H04W 4/028; H04W 4/04; G08B 21/24
See application file for complete search history.

(56) References Cited

U.S. PATENT DOCUMENTS

| 2010/0283601 | A1* | 11/2010 | Tai .......................... G06Q 50/24 340/539.12 |
| 2011/0173323 | A1 | 7/2011 | Fimbel et al. |
| 2014/0357247 | A1 | 12/2014 | Assuncao et al. |
| 2015/0079949 | A1 | 3/2015 | Vishwanath |
| 2016/0354285 | A1* | 12/2016 | Nolan ................... A61J 7/0481 |

FOREIGN PATENT DOCUMENTS

| CN | 103795841 A | 5/2014 |
| CN | 104125687 A | 10/2014 |
| CN | 104486504 A | 4/2015 |
| JP | 2009027657 A | 2/2009 |
| KR | 20020050537 A | 6/2002 |

(Continued)

OTHER PUBLICATIONS

International Search Report for PCT/CN2015/099731.
Extended European Search Report of EP16188676.7.
International Search Report of PCT/CN2015/099731.

*Primary Examiner* — Leon Flores
(74) *Attorney, Agent, or Firm* — Jun He Law Offices P.C.; James J. Zhu

(57) ABSTRACT

A method and device for reminding a user are provided. The method includes: monitoring a region in which a mobile terminal presents; when a reminding operation of the mobile terminal is activated, determining a target region in which a human body presents; and if the target region doesn't comprise the region in which the mobile terminal presents, sending a reminding notice to a reminding device in the target region for instructing the reminding device to send a reminder corresponding to the reminding operation to the user.

15 Claims, 8 Drawing Sheets

(56) References Cited

FOREIGN PATENT DOCUMENTS

| KR | 20050107141 A | 9/2006 |
|----|---------------|--------|
| RU | 53510 U1 | 5/2006 |
| WO | 2010006647 A1 | 1/2010 |
| WO | 2013175804 A1 | 11/2013 |
| WO | 2015/091040 A1 | 6/2015 |

* cited by examiner

METHOD AND DEVICE FOR REMINDING USER

CROSS-REFERENCE TO RELATED APPLICATIONS

This application is based on and claims priority to Chinese Patent Application No. 201510642384.1, filed on Sep. 30, 2015, the entire contents of which are incorporated herein by reference.

TECHNICAL FIELD

The present disclosure generally relates to the field of smart home technology, and more particularly, to a method and device for reminding a user.

BACKGROUND

With continuous advancement of computer and communication technology, mobile terminals such as smart phones are becoming more and more popular, and have brought significant convenience to people's everyday life.

In case that a mobile terminal receives or generates a message that needs to be checked in time by the user, the mobile terminal will generally carry out the preset reminding operations. In the related art, the mobile terminal will remind the user by ringing using a built-in speaker, or by vibrating using a built-in motor. However, when the mobile terminal is far away from the user, its ringing sound or vibration may not reach the user timely, which means a poor reminding effect.

SUMMARY

According to a first aspect of embodiments of the present disclosure, there is provided a method for reminding a user. The method includes: monitoring a region in which a mobile terminal is present, the region being one of at least two preset regions; when a reminding operation of the mobile terminal is activated, determining a target region in which a human body is present from the at least two preset regions; and if the target region doesn't comprise the region in which the mobile terminal is present, sending a reminding notice to a reminding device in the target region for instructing the reminding device to send a reminder corresponding to the reminding operation to the user.

According to a second aspect of the embodiments of the present disclosure, there is provided a mobile terminal for reminding a user. The mobile terminal includes: a processor; and a memory for storing instructions executable by the processor. The processor is configured to perform: monitoring a region in which a mobile terminal is present, the region being one of at least two preset regions; when a reminding operation of the mobile terminal is activated, determining a target region in which a human body is present from the at least two preset regions; and if the target region doesn't comprise the region in which the mobile terminal is present, sending a reminding notice to a reminding device in the target region for instructing the reminding device to send a reminder corresponding to the reminding operation to the user.

According to a third aspect of the embodiment of the present disclosure, there is provided a non-transitory computer-readable storage medium storing instructions, executable by a processor in a mobile terminal, for performing a method for reminding a user. The method includes: monitoring a region in which a mobile terminal is present, the region being one of at least two preset regions; when a reminding operation of the mobile terminal is activated, determining a target region in which a human body is present from the at least two preset regions; and if the target region doesn't comprise the region in which the mobile terminal is present, sending a reminding notice to a reminding device in the target region for instructing the reminding device to send a reminder corresponding to the reminding operation to the user.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIG. 1 illustrates a diagram about an implementing environment that the disclosure relates to.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
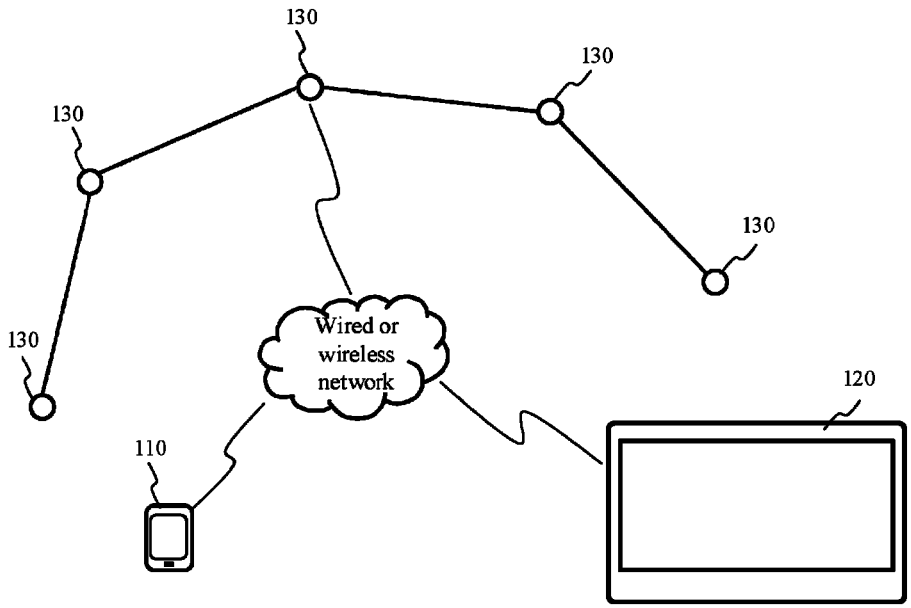

FIG. 1 illustrates an implementing environment that the disclosure relates to, which includes: a mobile terminal 110 and at least one intelligent device 120.

The mobile terminal 110 may be smart phones, tablets, e-book readers or other kinds of intelligent terminals.

The at least one intelligent device 120 may be any kind of smart home device, such as smart TVs, set-top boxes for smart TVs, smart air conditioners, smart cameras and so on.

The mobile terminal 110 may be connected to the intelligent device 120 via wired or wireless networks.

Optionally, the at least one intelligent device 120 is distributed in at least two preset regions, and each region has several sensors 130 installed. Those sensors 130 may include a human body sensor, a door sensor, a window sensor, and so on. Those sensors 130 may be connected to the mobile terminal 110 via wired or wireless networks. For instance, in an implementation scenario, the mobile terminal 110 is connected via a wireless network to an intelligent router, which makes up a network with the sensors 130 based on Zigbee, so that the mobile terminal 110 can receive sensor parameters collected by the sensors 130 via the intelligent router.

Figure 2:
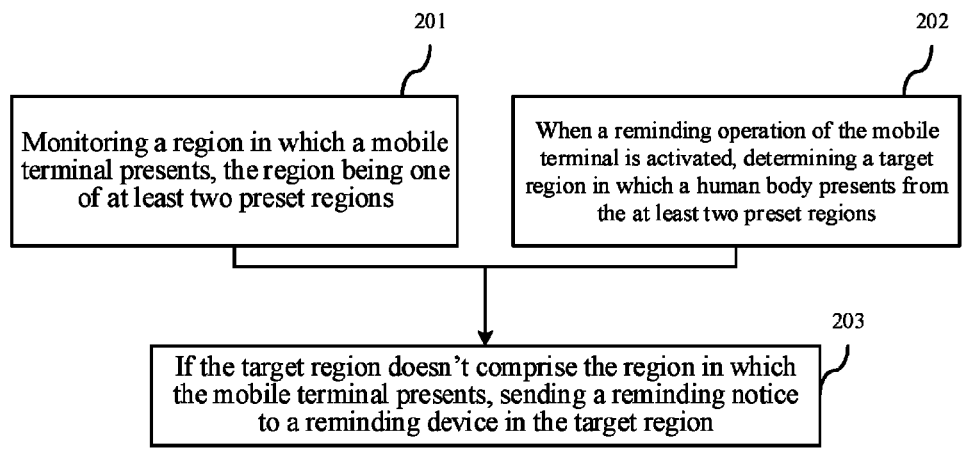
FIG. 2 is a flow chart showing a method for reminding a user according to an exemplary embodiment.

FIG. 2 is a flow chart showing a method for reminding a user according to an exemplary embodiment. The method can be applied to the mobile terminal 110 in the implementing environment as shown in FIG. 1. As shown in FIG. 2, the method may include following steps.

In Step 201, a region in which a mobile terminal is present is monitored, wherein the region is one of at least two preset regions.

In Step 202, when the reminding operation of the mobile terminal is activated, a target region in which a human body is present is determined from one of the at least two preset regions.

In Step 203, if the target region doesn't include the region in which the mobile terminal is present, a reminding notice is sent to a reminding device in the target region.

The reminding notice is used for instructing the reminding device to send a reminder corresponding to the reminding operation.

In summary, the method for reminding a user as shown in this embodiment comprises: a region in which a mobile terminal is present is monitored; when the reminding operation of the mobile terminal is activated, a target region in which a human body is present is determined; if the target region doesn't include the region in which the mobile terminal is present, a reminding notice is sent to a reminding device in the target region. That means, in case that there is no human body in the region where the mobile terminal is, when the reminding operation of the mobile terminal is activated, an intelligent device in a region where a human body is detected can be controlled to send a reminder. In this way, even if users didn't carry their mobile terminals, a reminder can still reach them effectively, which therefore improves the reminding effect.

Figure 3A:
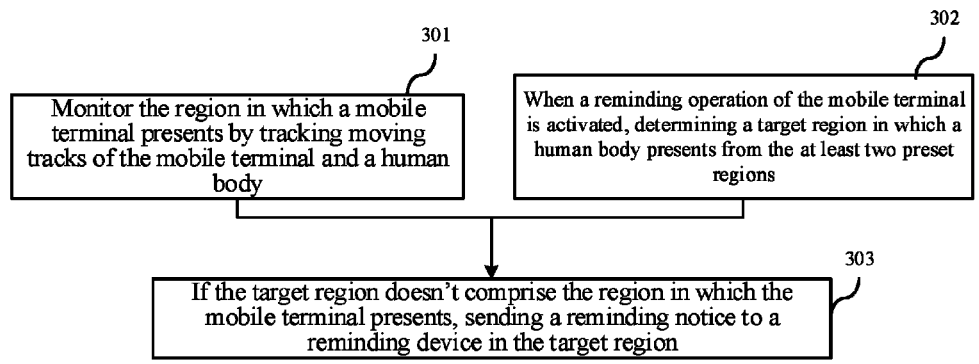
FIG. 3A is a flow chart showing another method for reminding a user according to an exemplary embodiment.

FIG. 3A is a flow chart showing another method for reminding a user according to an exemplary embodiment. The method is applied to the mobile terminal 110 in the implementing environment as shown in FIG. 1. As shown in FIG. 3A, the method may include following steps.

In Step 301, the region in which a mobile terminal is present is monitored by tracking moving tracks of the mobile terminal and a human body respectively.

The region in which a mobile terminal is present is among the at least two preset regions.

Figure 3B:
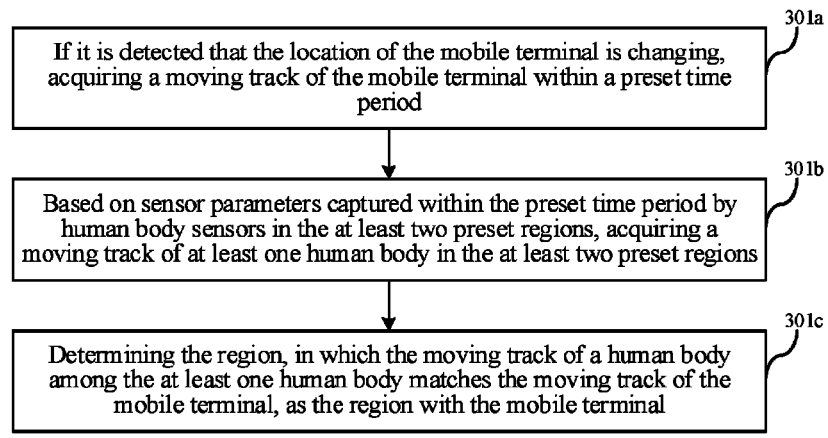
FIG. 3B is a flow chart showing a region determining method corresponding to the embodiment of FIG. 3A.

In this solution as shown in this embodiment, the region in which a mobile terminal is present can be monitored by tracking moving tracks of the mobile terminal and a human body respectively within a same time period. FIG. 3B is a flow chart showing a region determining method, which may include the following steps.

In Step 301a, if it is detected that a location of the mobile terminal is changing, a moving track of the mobile terminal within a preset time period is acquired.

The preset time period is a preset time period between a moment when the mobile terminal starts moving and a moment when the mobile terminal stops moving.

The mobile terminal may have a built-in accelerometer sensor to capture parameters used for detecting the motion state of the mobile terminal, such as starting moving, moving direction, moving speed, moving acceleration, and so on. After detecting that mobile terminal has started moving, the motion track of the mobile terminal within the preset time period can be calculated using the parameters captured by the accelerometer sensor.

In Step 301b, based on sensor parameters captured within the preset time period by human body sensors in the at least two preset regions, a moving track of at least one human body in the at least two preset regions is acquired.

Figure 3C:
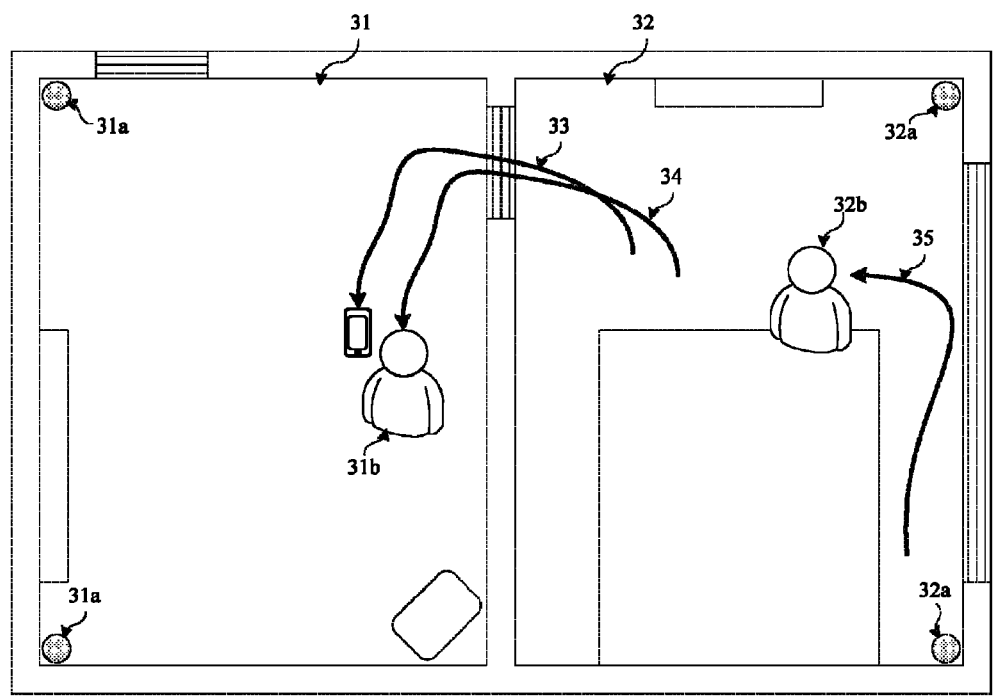
FIG. 3C is a schematic diagram of determining a region with a mobile terminal therein corresponding to the embodiment of FIG. 3A.

The moving track of the human body can be determined using the sensor parameters captured by the human body sensors. For example, with reference to FIG. 3C showing a diagram about determining a region with a mobile terminal therein, a preset space 31 indicates a bedroom having at least one human body sensor 31a and a human body 31b, and a preset space 32 indicates a living room having at least one human body sensor 32a and a human body 32b. The at least one human body sensor 31a and the at least one human body sensor 32a can transmit the captured sensor parameters to the mobile terminal via wired or wireless networks. The mobile terminal can calculate its own moving track within a preset time period, and meanwhile calculate respective moving tracks of the human bodies 31b and 32b based on the captured sensor parameters by the at least one human body sensors 31a and 32a.

In Step 301c, the region, in which the moving track of a human body among the at least one human body matches the moving track of the mobile terminal, is determined as the region in which the mobile terminal is present.

With reference to FIG. 3C, for example, the calculated track of the mobile terminal is the moving track 33, the moving tracks of the human bodies 31b and 32b are the moving tracks 34 and 35 respectively. Then a matching degree calculation is carried out between the moving track 33 and each of the moving tracks 34 and 35. The result shows there is a high matching degree between the moving track 33 and the moving track 34, which means it is probably the human body 31b moving with the mobile terminal. At this time, the region in which the human body 31b is present is determined as the region in which the mobile terminal is present.

When the mobile terminal stops moving, the region in which the mobile terminal is present is the region in which the human body matching the moving track of the mobile terminal is present. In duration that the mobile terminal remains still, the region of the mobile terminal keeps unchanged. When the mobile terminal starts moving again, steps 301a-301c are repeated.

In practical applications, the end of the preset time period is in principle no later than the moment when the mobile terminal stops moving, to avoid failing to detect the matched moving track of a human body if the user puts down the mobile terminal halfway and keeps moving.

In this embodiment, as an example, the region in which the mobile terminal is present is monitored only by using the respective moving tracks of the mobile terminal and the human body. In practical applications, the region in which the mobile terminal is present can also be monitored by other methods, for example, by means of indoor wireless positioning technique, which are not limited in the present disclosure.

In Step 302, when the reminding operation of the mobile terminal is activated, a target region is determined, wherein the target region is the one with a human body present of the at least two preset regions.

When the mobile terminal detects a preset event, it will activate a reminding operation. For example, the mobile terminal activates an incoming call reminding operation when receiving an incoming call, a message reminding operation when receiving a message, or an alarm reminding operation when it is the preset time in the alarm clock.

In a first implementation, when a reminding operation is activated, with respect to each of the at least two preset regions, the mobile terminal: acquires sensor parameters captured by a human body sensor in the region; detects if a human body is present in the region based on the sensor parameters; and determines the region as the target region, if it is detected that a human body is in the region. That is, the mobile terminal determines the target region having a human body therein by using the human body sensors distributed in respective regions. The scenario with the human body sensors arranged can be referred to FIG. 3C, which is not described herein.

In a second implementation, when a reminding operation is activated, the mobile terminal: detects if a state of the mobile terminal satisfies a first predetermined condition; acquires sensor parameters captured by a human body sensor in the region, if it is detected that the state of the mobile terminal satisfies the first predetermined condition, with respect to each of the at least two preset regions; detects if a human body is present in the region based on the sensor parameters; and determines the region as the target region, if it is detected that a human body is present in the region. The state of the mobile terminal includes a motion state and an operation state, and the first predetermined condition includes the motion state of the mobile terminal being static and the operation state of the mobile terminal being receiving no user operation.

That means when the mobile terminal is in static state and hasn't received a user operation, it can determine the target region with a human body therein by using the human body sensors distributed in respective regions. The scenario with the human body sensors arranged can be referred to FIG. 3C.

In a third implementation, when a reminding operation is activated, the mobile terminal: detects if a state of the mobile terminal satisfies a second predetermined condition; determines the region in which the mobile terminal is present as the target region, if it is detected that the state of the mobile terminal satisfies the second predetermined condition. The state of the mobile terminal includes a motion state and an operation state, and the second predetermined condition includes at least one of the motion state of the mobile terminal being moving and the operation state of the mobile terminal being receiving a user operation.

In the above second and third implementations, if the state of the mobile terminal satisfies the first predetermined condition, i.e., the mobile terminal is in static state and hasn't received a user operation, it is hard to determine whether it is being carried by the user. At this time, the region with a human body therein can be determined using the human body sensors. In the above second and third implementations, if the state of the mobile terminal satisfies the second predetermined condition, it means that the mobile terminal is being used or carried by the user, that is, the human body is present in the region with the mobile terminal therein. At this time, the region with the mobile terminal therein can be directly determined as the target region. In determining the target region by the second and third implementations, if the region with the mobile terminal therein can be determined as the target region by detecting the state of the mobile terminal, the detection on the human body becomes unnecessary, thereby saving computing resource and the terminal's electricity consumption.

In Step 303, if the target region doesn't include the region in which the mobile terminal exists, a reminding notice is sent to a reminding device in the target region.

The reminding notice is for instructing the reminding device to send a reminder corresponding to the reminding operation.

In the above step, if the target region is determined by sensor parameters captured by a human body sensors, then it can be further determined whether the target region includes the region in which the mobile terminal is present. For example, the position relationship of respective regions can be pre-stored, so whether the target region includes the region with the mobile terminal can be determined based on the position relationship. Or if the target region is determined by detecting whether a state of the mobile terminal satisfies a second predetermined condition, then if a state of the mobile terminal satisfies a second predetermined condition, it means the target region includes the region in which the mobile terminal is present. In other words, if the target region includes the region with the mobile terminal, it means that the user also is in the region with the mobile terminal. At this time, the reminding operation can be performed only by the mobile terminal itself, which can achieve a good reminding effect. However, if the target region doesn't include the region with the mobile terminal, it means that the user is not present in the region with the mobile terminal. At this time, the reminding operation needs to be performed via other intelligent devices in the region where the user is.

The correspondence between each of respective preset regions and its reminding device can be pre-stored in the mobile terminal. The reminding device may be intelligent TVs, smart air conditioners, or any other smart household devices. Optionally, in practical applications, if there are several reminding devices in the target region, the reminding notice is sent to the one of the reminding devices, which is in the open state.

Figure 3D:
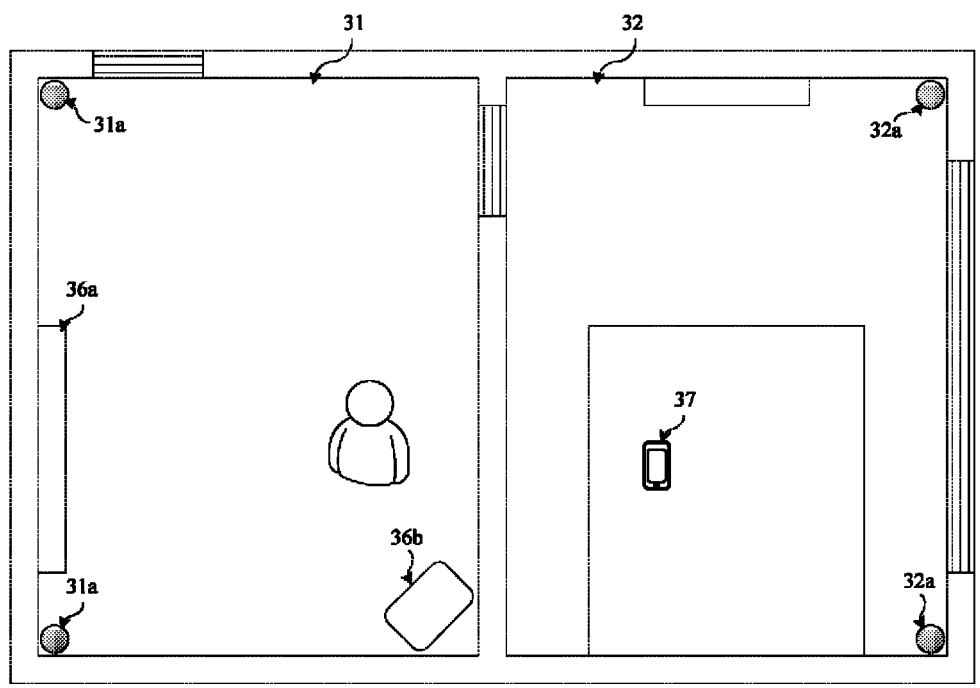
FIG. 3D illustrates a scenario of reminding a user corresponding to the embodiment of FIG. 3A.

Take the mobile terminal being a smart phone and the reminding notice being an intelligent TV as an example. Referring to FIG. 3D illustrating a scenario for reminding, a preset space 31 indicates a bedroom having at least one human body sensor 31a, and a preset space 31 indicates a living room having at least one human body sensor 31a, an intelligent TV 36a, and a smart air conditioner 36b. In the preset space 31 (living room), a user called Mr.Wong is watching TV, with his smart phone 37 on the bed in the preset space (bedroom). If there is an incoming call, the smart phone 37 detects that there is no human body in preset space 32 while there is a human body in the preset space 31, and finds out by inquiring that the preset space 32 has the intelligent TV 36a and the smart air conditioner 36b as the reminding devices. Since the intelligent TV 36a is in the open state, then the smart phone 37 will send a reminding notice to the intelligent TV 36a via the local network in the home. The intelligent TV 36a will display the reminding message of incoming call received by the smart phone 37 on its screen.

In summary, in the method for reminding a user as shown in this embodiment, a region in which a mobile terminal is present is monitored, when a reminding operation of the mobile terminal is activated, a target region in which a human body is present is determined, and if the target region doesn't include the region in which the mobile terminal is present, a reminding notice is sent to a reminding device in the target region. That means, in case that the region in which the mobile terminal is present has no human body in it, when a reminding operation of the mobile terminal is activated, an intelligent device in a region having a human body can be controlled to send a reminder. In this way, even if users didn't carry their mobile terminals, a reminder can still reach them effectively, which therefore improves the reminding effect.

In addition, in the method for reminding a user as shown in this embodiment, during determination of the target region, if the state of the mobile terminal satisfies the second predetermined condition, the region with the mobile terminal therein can be directly determined as the target region. In this case, the detection on the human body becomes unnecessary, thus saving computing resource and the terminal's electricity consumption as well as improving the terminal's battery life, or the ability to hold charge.

Figure 4A:
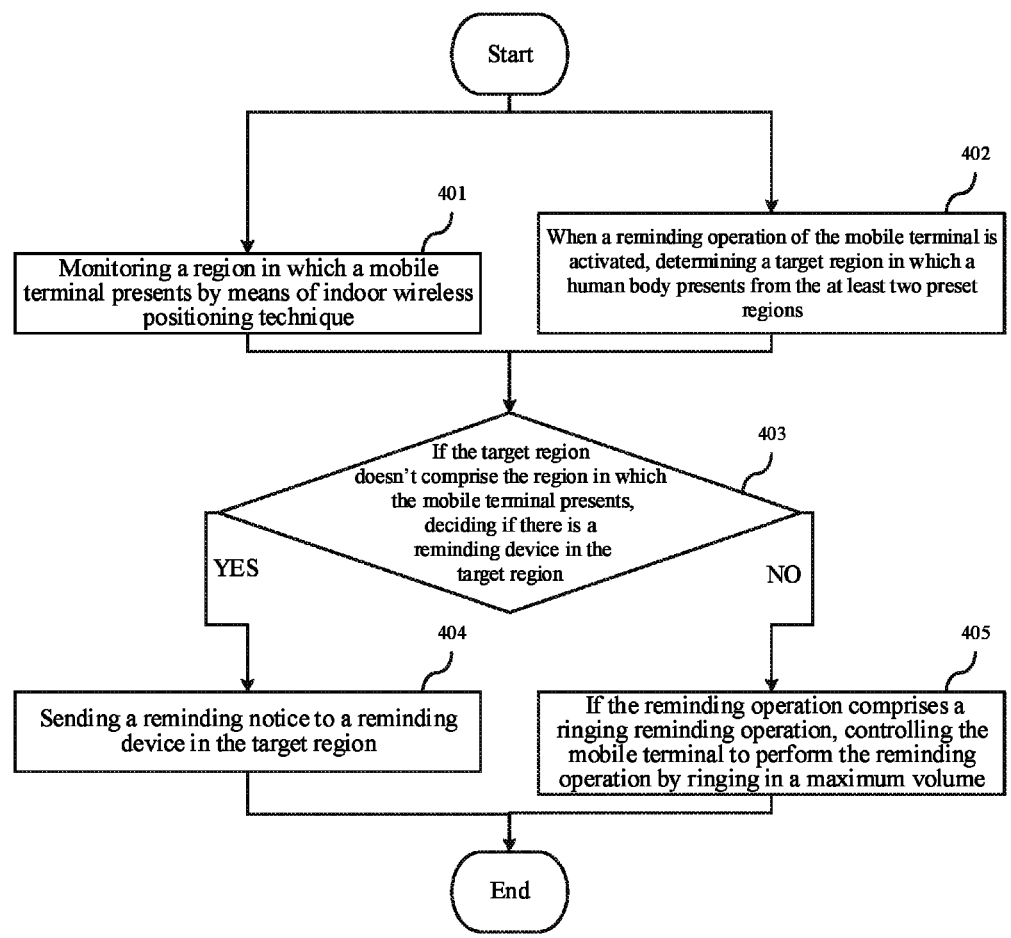
FIG. 4A is a flow chart showing another method for reminding a user according to an exemplary embodiment.

FIG. 4A is a flow chart showing another method for reminding a user according to an exemplary embodiment. The method can be applied to the mobile terminal 110 in the implementing environment as shown in FIG. 1. As shown in FIG. 4A, the method may include following steps.

In Step 401, a region in which a mobile terminal is present is monitored by means of indoor wireless positioning technique.

The region in which a mobile terminal is present can be one of at least two preset regions.

In addition to the embodiment with reference to FIG. 3A, where the region in which a mobile terminal is present can be monitored using respective moving tracks of the mobile terminal and a human body within a same time period, this embodiment discloses another way of monitoring a region in which a mobile terminal is present, that is by means of indoor wireless positioning technique.

Figure 4B:
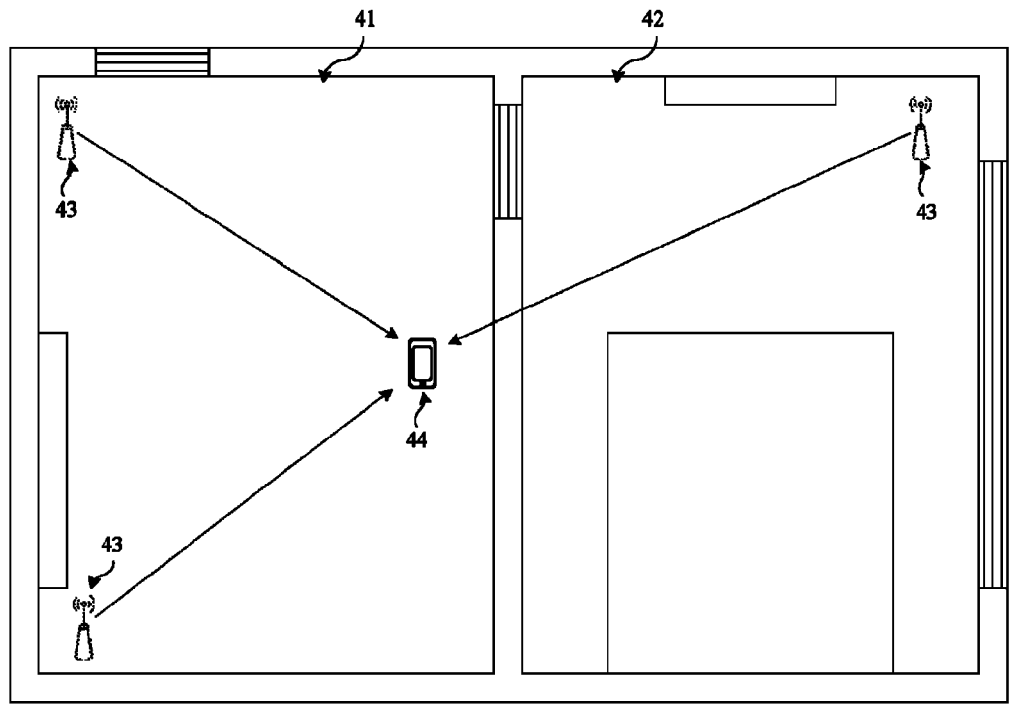
FIG. 4B is a schematic diagram about determining a region with a mobile terminal therein corresponding to the embodiment of FIG. 4A

In the example illustrated in FIG. 4B, a diagram on determining a region with a mobile terminal therein is provided, in which a preset space 42 indicates a bedroom, and a preset space 41 indicates a living room. The preset spaces 41 and 42 have at least three wireless signal emission points 43 at designated positions. The mobile terminal 44 can determine the relative position of itself and the three wireless signal emission points 43 based on time lengths of receiving signals emitted from the three wireless signal emission points 43, so as to determine which of the preset spaces 41 and 42 has a mobile terminal therein.

In Step 402, when a reminding operation of the mobile terminal is activated, a target region in which a human body is present is determined from the at least two preset regions.

In Step 403, if the target region doesn't include the region in which the mobile terminal is present, then decide if there is a reminding device in the target region. If yes, proceed to Step 404; otherwise, proceed to Step 405.

In Step 404, a reminding notice is sent to a reminding device in the target region.

For the specific implementations of the above Steps 402-404, the Steps 302-303 in the embodiment of FIG. 3A may be referred to, which is not elaborated herein.

In Step 405, the mobile terminal is controlled to carry out the reminding operation by ringing in a volume higher than a preset value.

When there is no human body in the region with the mobile terminal therein and there is no reminding device in the region with a human body therein, the mobile terminal may raise the volume of the ringing reminding operation to a value higher than that preset by the user. For example, if the maximum value for the ringing of the mobile terminal is 10, the value preset by the user is 5, when the mobile terminal detects that there is no human body in the region with the mobile terminal therein and there is no reminding device in the region with a human body therein, the mobile terminal may carry out the reminding operation by ringing in a volume (such as 8 or 10) higher than 5, so as to enhance the reminding effect.

In summary, in the method for reminding a user as shown in this embodiment, a region in which a mobile terminal is present is monitored, when a reminding operation of the mobile terminal is activated, a target region in which a human body is present is determined, and if it is detected that the target region doesn't include the region in which the mobile terminal is present, a reminding notice is sent to a reminding device in the target region. That means, in case that the region in which the mobile terminal is present has no human body when a reminding operation of the mobile terminal is activated, an intelligent device in a region having a human body can be controlled to send a reminder. In this way, even if users didn't carry their mobile terminals, a reminder can still reach them effectively, which therefore improves the reminding effect.

In addition, in the method for reminding as shown in this embodiment, when a reminding operation of the mobile terminal is activated, if it is detected that the state of the mobile terminal satisfies the second predetermined condition, the region with the mobile terminal therein can be directly determined as the target region. In this case, the detection on the human body becomes unnecessary, thus saving computing resource and the terminal's electricity consumption as well as improving the terminal's battery life.

Further, in the method for reminding a user as shown in this embodiment, when there is no human body in the region with the mobile terminal therein and there is no reminding device in the region with a human body therein, the mobile terminal may perform the ringing reminding operation in a volume higher than the preset value, so as to enhance the reminding effect.

The device embodiments will be described below, which can be used to perform the method embodiments. For details not disclosed in the device embodiments, see the corresponding part of the method embodiments.

Figure 5:
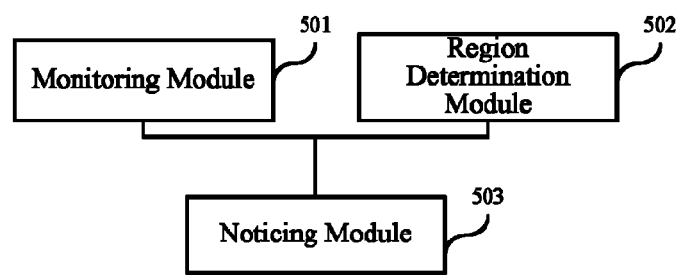
FIG. 5 is a structural block diagram of a device for reminding a user according to an exemplary embodiment.

FIG. 5 is a block diagram of a device for reminding a user according to an exemplary embodiment, which can be applied to the mobile terminal 110 in the implementing environment as shown in FIG. 1, for performing all or part of the steps of the method as shown in FIG. 2, FIG. 3A or FIG. 4A. As shown in FIG. 5, the device may include a monitoring module 501, a region determination module 502, and a noticing module 503.

The monitoring module 501 is configured to monitor a region in which a mobile terminal is present, wherein the region is one of at least two preset regions.

The region determination module 502 is configured to, when a reminding operation of the mobile terminal is activated, determine a target region in which a human body is present, from the at least two preset regions.

The noticing module 503 is configured to send a reminding notice to a reminding device in the target region for instructing the reminding device to send a reminder corresponding to the reminding operation, if the target region determined by the region determination module doesn't include the region in which the mobile terminal is present.

In summary, in the device for reminding a user as shown in this embodiment, a region in which a mobile terminal is present is monitored, when a reminding operation of the mobile terminal is activated, a target region in which a human body is present is determined. If the target region doesn't include the region in which the mobile terminal is present, a reminding notice is sent to a reminding device in the target region. That means, in case that the region in which the mobile terminal is present has no human body present in it when a reminding operation of the mobile terminal is activated, an intelligent device in a region having a human body can be controlled to send a reminder. In this way, even if users didn't carry their mobile terminals, a reminder can still reach them effectively, which therefore improves the reminding effect.

Figure 6:
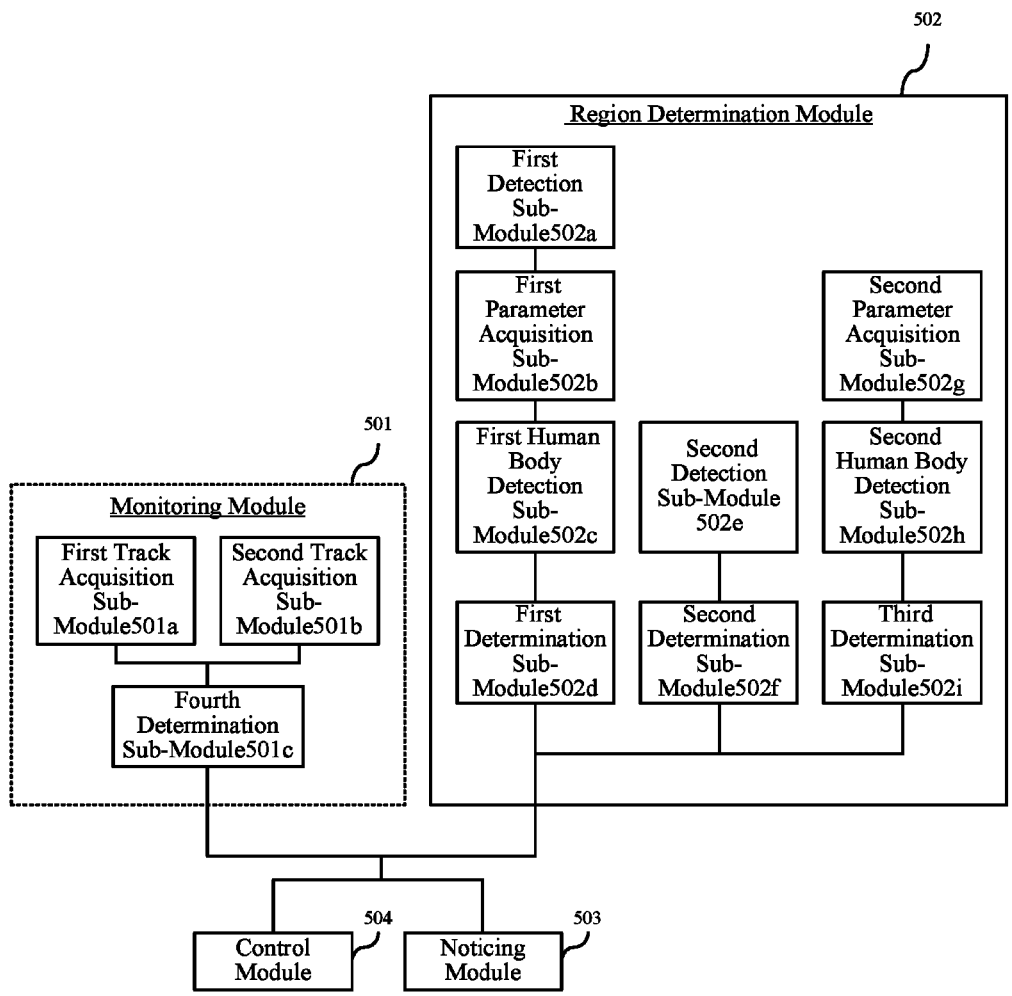
FIG. 6 is a structural block diagram of another device for reminding a user according to an exemplary embodiment.

FIG. 6 is a block diagram of a device for reminding according to an exemplary embodiment, which can be applied to the mobile terminal 110 in the implementing environment as shown in FIG. 1, for performing all or part of steps of the reminding method as shown in FIG. 2, FIG. 3A or FIG. 4A. As shown in FIG. 6, the device may include a Monitoring Module 501, a Region Determination Module 502, and a Noticing Module 503.

The monitoring module 501 is configured to monitor a region in which a mobile terminal is present, wherein the region is one of at least two preset regions.

The region determination module 502 is configured to determine a target region in which a human body is present from the at least two preset regions, when a reminding operation of the mobile terminal is activated.

The noticing module 503 is configured to send a reminding notice to a reminding device in the target region for instructing the reminding device to send a reminder corresponding to the reminding operation, if the target region determined by the region determination module doesn't include the region in which the mobile terminal is present.

Optionally, the region determination module 502 includes: a first detection sub-module 502a configured to detect if a state of the mobile terminal satisfies a first predetermined condition; a first parameter acquisition sub-module 502b configured to acquire sensor parameters captured by a human body sensor in each of the at least two preset regions, if it is detected by the first detection sub-module that the state of the mobile terminal satisfies the first predetermined condition; a first human body detection sub-module 502c configured to detect if a human body is present in the region based on the sensor parameters acquired by the first parameter acquisition sub-module; and a first determination sub-module 502d configured to, determine the region as the target region, if it is detected by the first human body detection sub-module that a human body is in the region. The state of the mobile terminal includes a motion state and an operation state, and the first predetermined condition includes the motion state of the mobile terminal being static and the operation state of the mobile terminal being receiving no user operation.

Optionally, the region determination module 502 includes: a second detection sub-module 502e configured to detect if a state of the mobile terminal satisfies a second predetermined condition; a second determination sub-module 502f configured to determine the region in which the mobile terminal is present as the target region, if it is detected by the second detection sub-module that the state of the mobile terminal satisfies the second predetermined condition. The state of the mobile terminal includes a motion state and an operation state, and the second predetermined condition includes at least one of the motion state of the mobile terminal being moving and the operation state of the mobile terminal being receiving a user operation.

Optionally, the region determination module 502 includes: a second parameter acquisition sub-module 502g configured to acquire sensor parameters captured by a human body sensor arranged in each region of the at least two preset regions; a second human body detection sub-module 502h configured to detect if a human body is present in the region based on the sensor parameters acquired by the second parameter acquisition sub-module; and a third determination sub-module 502i configured to determine the region as the target region, if it is detected by the second human body detection sub-module that a human body is in the region.

Optionally, the monitoring module 501 includes: a first track acquisition sub-module 501a configured to acquire a moving track of the mobile terminal within a preset time period between a moment when the mobile terminal starts moving and a moment when mobile terminal stops moving, if it is detected that the location of the mobile terminal is changing; a second track acquisition sub-module 501b configured to acquire a moving track of at least one human body in the at least two preset regions, based on the sensor parameters captured within the preset time period by human body sensors in the at least two preset regions; and a fourth determination sub-module 501c configured to determine the region as the target region, in which the moving track of a human body among the at least one human body matches the moving track of the mobile terminal.

Optionally, the monitoring module 501 is configured to monitor the region in which a mobile terminal is present by means of indoor wireless positioning technique.

Optionally, the device further includes: a control module 504 configured to control the mobile terminal to carry out the reminding operation by ringing in a volume higher than a preset value, if the target region doesn't include the region in which the mobile terminal is present while the reminding device is not in the target region.

In summary, in the device for reminding a user as shown in this embodiment, a region in which a mobile terminal is present is monitored, when a reminding operation of the mobile terminal is activated, a target region in which a human body is present is determined, and if it is detected that the target region doesn't include the region in which the mobile terminal is present, a reminding notice is sent to a reminding device in the target region. That means, in case that the region in which the mobile terminal is present has no human body in it when a reminding operation of the mobile terminal is activated, an intelligent device in a region having a human body can be controlled to send a reminder. In this way, even if users didn't carry their mobile terminals, a reminder can still reach them effectively, which therefore improves the reminding effect.

In addition, in the device for reminding as shown in this embodiment, when a reminding operation of the mobile terminal is activated, if it is detected that the state of the mobile terminal satisfies the second predetermined condition, the region with the mobile terminal therein can be directly determined as the target region. In this case, the detection on the human body becomes unnecessary, thus saving computing resource and the terminal's electricity consumption as well as improving the terminal's battery life.

Further, in the device for reminding as shown in this embodiment, when there is no human body in the region with the mobile terminal therein and there is no reminding device in the region with a human body therein, the mobile terminal may perform the ringing reminding operation in a volume higher than the preset value, so as to enhance the reminding effect.

Figure 7:
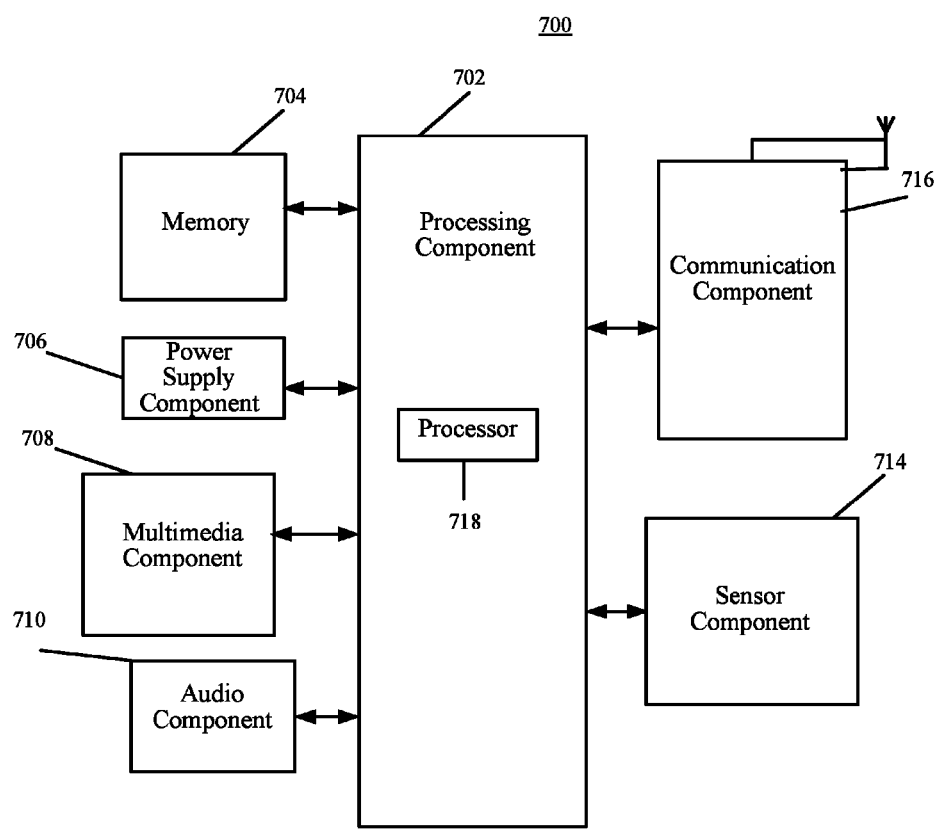
FIG. 7 is a structural block diagram of a device according to an exemplary embodiment.

FIG. 7 is a structural block diagram of a device 700 for reminding a user according to an exemplary embodiment.

For example, the device 700 may be smart phones, tablets, e-book readers or other kinds of intelligent terminals.

Referring to FIG. 7, the device 700 may include one or more of the following components: a processing component 702, a memory 704, a power supply component 706, a multimedia component 708, an audio component 710, a sensor component 714, and a communication component 716.

The processing component 702 typically controls overall operations of the device 700, such as the operations associated with display, telephone calls, data communications, camera operations, and recording operations. The processing component 702 may include one or more processors 718 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. The memory 704 further have one or more modules therein, which are configured to be performed by the one or more processors 718 for performing all or part of the steps in any method showed with reference to FIG. 2, 3A or 4A.

The power supply component 706 provides power to various components of the device 700. The power supply component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The sensor component 714 includes one or more sensors to provide status assessments of various aspects of the device 700. For instance, the sensor component 714 may detect an open/closed status of the device 700, relative positioning of components, a change in position of the device 700 or a component of the device 700, and a change in temperature of the device 800. In some embodiments, the sensor component 714 may also include a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G or 3G or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 718 in the device 700, for performing the above-described methods. For example, the non-transitory computer-readable storage medium may be a ROM, a RAM, a CD-ROM, a magnetic tape, a floppy disc, an optical data storage device, and the like.

With respect to the devices in the above embodiments, the specific manners for performing operations for individual modules therein have been described in detail in the embodiments regarding the methods, which will not be elaborated herein.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for reminding a user, comprising:
   monitoring a region in which a mobile terminal is present, the region being one of at least two preset regions;
   when a reminding operation of the mobile terminal is activated, determining a target region in which a human body is present from the at least two preset regions; and
   if the target region doesn't comprise the region in which the mobile terminal is present, sending a reminding notice to a reminding device in the target region for instructing the reminding device to send a reminder corresponding to the reminding operation to the user.

2. The method of claim 1, wherein determining the target region comprises:
   detecting if a state of the mobile terminal satisfies a first predetermined condition;

if it is detected that the state of the mobile terminal satisfies the first predetermined condition, with respect to the at least two preset regions, acquiring sensor parameters captured by a human body sensor in the regions;

detecting if a human body is present in the region based on the sensor parameters; and if it is detected that a human body is present in the region, determining the region as the target region;

wherein the state of the mobile terminal comprises a motion state and an operation state, and the first predetermined condition comprises the motion state of the mobile terminal being static and the operation state of the mobile terminal being receiving no user operation.

3. The method of claim 1, wherein determining the target region comprises:

detecting if a state of the mobile terminal satisfies a second predetermined condition; and if it is detected that the state of the mobile terminal satisfies the second predetermined condition, determining the region in which the mobile terminal is present as the target region;

wherein the state of the mobile terminal comprises a motion state and an operation state, and the second predetermined condition comprises at least one of the motion state of the mobile terminal being moving currently and the operation state of the mobile terminal being receiving a user operation.

4. The method of claim 1, wherein determining the target region comprises:

with respect to the at least two preset regions, acquiring sensor parameters captured by a human body sensor in the regions;

detecting if a human body is present in the region based on the sensor parameters; and if it is detected that a human body is present in the region, determining the region as the target region.

5. The method of claim 1, wherein monitoring the region in which the mobile terminal is present comprises:

if it is detected that a location of the mobile terminal is changing, acquiring a moving track of the mobile terminal within a preset time period between a moment when the mobile terminal starts moving and a moment when the mobile terminal stops moving;

based on sensor parameters captured within the preset time period by human body sensors in the at least two preset regions, acquiring a moving track of at least one human body in the at least two preset regions; and determining the region, in which the moving track of a human body among the at least one human body matches the moving track of the mobile terminal, as the region in which the mobile terminal is present.

6. The method of claim 1, wherein monitoring the region in which the mobile terminal is present comprises:

monitoring the region in which the mobile terminal is present by means of indoor wireless positioning technique.

7. The method of claim 1, further comprising:

if the target region doesn't comprise the region in which the mobile terminal is present and the reminding device is not present in the target region, controlling the mobile terminal to carry out the reminding operation by ringing in a volume higher than a preset value.

8. A mobile terminal for reminding a user, comprising:

a processor; and a memory for storing instructions executable by the processor;

wherein the processor is configured to perform:

monitoring a region in which a mobile terminal is present, the region being one of at least two preset regions;

when a reminding operation of the mobile terminal is activated, determining a target region in which a human body is present from the at least two preset regions; and if the target region doesn't comprise the region in which the mobile terminal is present, sending a reminding notice to a reminding device in the target region for instructing the reminding device to send a reminder corresponding to the reminding operation to the user.

9. The mobile terminal of claim 8, wherein determining the target region comprises:

detecting if a state of the mobile terminal satisfies a first predetermined condition;

if it is detected that the state of the mobile terminal satisfies the first predetermined condition, with respect to the at least two preset regions, acquiring sensor parameters captured by a human body sensor in the regions;

detecting if a human body is present in the region based on the sensor parameters; and if it is detected that a human body is present in the region, determining the region as the target region;

wherein the state of the mobile terminal comprises a motion state and an operation state, and the first predetermined condition comprises the motion state of the mobile terminal being static and the operation state of the mobile terminal being receiving no user operation.

10. The mobile terminal of claim 8, wherein determining the target region comprises:

detecting if a state of the mobile terminal satisfies a second predetermined condition; and if it is detected that the state of the mobile terminal satisfies the second predetermined condition, determining the region in which the mobile terminal is present as the target region;

wherein the state of the mobile terminal comprises a motion state and an operation state, and the second predetermined condition comprises at least one of the motion state of the mobile terminal being moving currently and the operation state of the mobile terminal being receiving a user operation.

11. The mobile terminal of claim 8, wherein determining the target region comprises:

with respect to the at least two preset regions, acquiring sensor parameters captured by a human body sensor in the regions;

detecting if a human body is present in the region based on the sensor parameters; and if it is detected that a human body is present in the region, determining the region as the target region.

12. The mobile terminal of claim 8, wherein monitoring the region in which the mobile terminal is present comprises:

if it is detected that a location of the mobile terminal is changing, acquiring a moving track of the mobile terminal within a preset time period between a moment when the mobile terminal starts moving and a moment when the mobile terminal stops moving;

based on sensor parameters captured within the preset time period by human body sensors in the at least two preset regions, acquiring a moving track of at least one human body in the at least two preset regions; and determining the region, in which the moving track of a human body among the at least one human body matches the moving track of the mobile terminal, as the region in which the mobile terminal is present.

13. The mobile terminal of claim 8, wherein monitoring the region in which the mobile terminal is present comprises:
monitoring the region in which the mobile terminal is present by means of indoor wireless positioning mobile terminal.

14. The mobile terminal of claim 8, wherein the processor is further configured to perform:
if the target region doesn't comprise the region in which the mobile terminal is present and the reminding device is not present in the target region, controlling the mobile terminal to carry out the reminding operation by ringing in a volume higher than a preset value.

15. A non-transitory computer-readable storage medium storing instructions, executable by a processor in a mobile terminal, for performing a method for reminding a user, comprising:
monitoring a region in which a mobile terminal is present, the region being one of at least two preset regions;
when a reminding operation of the mobile terminal is activated, determining a target region in which a human body is present from the at least two preset regions; and
if the target region doesn't comprise the region in which the mobile terminal is present, sending a reminding notice to a reminding device in the target region for instructing the reminding device to send a reminder corresponding to the reminding operation to the user.

* * * * *